Patented Oct. 20, 1953

2,656,343

UNITED STATES PATENT OFFICE 2,656,343

HYDROPEROXIDES OF DEHYDROABIETIC ACID DERIVATIVES

Paul F. Ritchie, Wilmington, Del., assignor to Hercules Powder Company, Wilmington, Del., a corporation of Delaware No Drawing. Application May 8, 1951, Serial No. 225,281

20 Claims. (Cl. 260—99)

This invention relates to new hydroperoxides and, more particularly, to the hydroperoxides of compounds containing the dehydroabietic acid nucleus and their preparation.

In accordance with this invention, it has been found that hydroperoxides of esters of dehydroabietic acid and substituted derivatives thereof may be prepared by oxidizing the dehydroabietic acid ester in liquid phase with an oxygen-containing gas and that the oxidative attack occurs chiefly at the 9- or 14-carbon atom of the dehydroabietic acid nucleus with the preferential attack occurring at the 9-carbon atom, if that position is unsubstituted. If the 9-position is already substituted as, for example, by oxygen, either in the form of a hydroxyl or oxo group, the attack is then almost wholly at the 14-position. Hence, the dehydroabietic acid ester to be oxidized is preferably one wherein a hydrogen atom is attached to either the 9- or 14-carbon atom as, for example, in esters of dehydroabietic acid, esters of 9-oxodehydroabietic acid, esters of 9-hydroxydehydroabietic acid, esters of 9-hydroperoxydehydroabietic acid, etc. The following formula represents the structure of the hydroperoxides produced in accordance with this invention and the numbering system used in this specification and claims appended hereto.

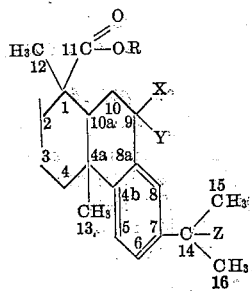

where R is an alkyl, hydroxyalkyl, aryl or aralkyl radical and where when Z is OOH and X is H, Y may be H, OH, or OOH, or X and Y together may be O, and when Z and X are H, Y is OOH. Substituents which may be prseent on carbon atoms other than the 9- and 14-carbon atoms in the esters of substituted dehydroabietic acids which are oxidized are such groups as halogen, alkyl radicals, nitro, cyano and acetyl groups, which substituents appear to have little or no effect on the oxidation of these compounds to the hydroperoxide. Thus the new hydroperoxides of this invention may contain one or more of such substituents in the molecule in addition to the ester group.

The following examples will illustrate the process of oxidation to produce hydroperoxides of esters of dehydroabietic acid and substituted derivatives thereof in accordance with this invention. Unless otherwise specified all quantities are on the basis of parts by weight.

Example 1

Fifteen parts of methyl dehydroabietate and 0.28 part of benzoyl peroxide were placed in a reaction vessel provided with a gas inlet tube at the bottom and a gas exit tube near the top, and the system was flushed out and filled with oxygen. The reaction mixture was liquefied by heating it to 77° C. and at which temperature it was held throughout the oxidation. Circulation of oxygen through the reaction mixture was then begun at the rate of 540 ml./min. During the course of the oxidation, the oxygen pressure was maintained constant at atmospheric pressure by the use of an automatic pressure compensator. The volume of oxygen absorbed was determined from time to time by direct reading of the gas burette through which the oxygen was introduced into the vessel. After 45 hours, the absorption of oxygen was substantially complete. It amounted to 0.795 mole per mole of ester. On analysis the reaction mixture was found to have a hydroperoxide content of 57.4 mole per cent.

Example 2

Fifteen parts of methyl dehydoabietate was oxidized at 90° C. in the presence of 0.18 part of benzoyl peroxide, following the procedure described in Example 1. After 48 hours, the absorption of oxygen had practically ceased. The amount of oxygen which had been absorbed was 0.944 mole per mole of ester. Analysis of the reaction mixture showed that it contained 60.5 mole per cent of hydroperoxide.

Example 3

Thirty parts of methyl dehydroabietate was oxidized in the presence of 1.35 parts of benzoyl peroxide at 80° C. and 760 mm. pressure of oxygen, using the procedure described in Example 1. The oxidation was terminated after 7 hours. The product so produced contained 37.8 mole per cent of hydroperoxide as compared with the oxygen absorption of 40.2 mole per cent.

Example 4

Fifteen parts of molten methyl dehydroabietate was oxidized as described in Example 1 at 77° C. except that the oxidation was carried out in the absence of an initiator. Absorption of oxygen began after 6.5 hours, the rate of oxidation slowly increasing to a maximum after about 100 hours and then again slowly decreasing. After 152 hours, the oxygen absorption amounted to 0.509 mole per mole of ester. Analysis of the oxidate showed that it contained 44.3 mole per cent of hydroperoxide.

*Example 5*

Fifteen parts of methyl dehydroabietate was oxidized at 91° C., following the procedure described in Example 1, except that 0.49 part of tert.-butyl hydroperoxide was used as the initiator. After 21.5 hours, the reaction mixture had absorbed 0.249 mole per mole of ester and contained 21.6 mole per cent of hydroperoxide.

*Example 6*

Fifteen parts of methyl dehydroabietate was oxidized following the procedure of Example 1 at 77° C. in the presence of 1.5 parts of an oxidized methyl dehydroabietate which contained 44% hydroperoxide by analysis. After 59 hours, the oxygen absorbed amounted to 0.14 mole per mole of ester and the oxidate contained 11.6 mole per cent of hydroperoxide.

*Example 7*

Fifteen parts of methyl dehydroabietate was oxidized in the presence of 1.94 part of azo-bis(isobutyronitrile) at 80° C. and 755 mm. pressure of oxygen. After 8.5 hours, the oxidation was stopped and the product was found to contain 10.6 mole per cent of hydroperoxide as compared with a theoretical hydroperoxide content of 11.5 mole per cent calculated from the oxygen absorption.

*Example 8*

Ten parts of methyl dehydroabietate was dissolved in 10 parts of tert.-butylbenzene and 0.37 part of benzoyl peroxide was added. Oxygen was passed into the reaction mixture which was held at 77°C. and after 22.5 hours, the reaction mixture had absorbed 0.546 mole of oxygen per mole of ester and contained 46.2 mole per cent of hydroperoxide.

*Example 9*

Ten parts of methyl dehydroabietate was oxidized with molecular oxygen in the presence of 0.186 part of benzoyl peroxide at 125° C. After 4.5 hours, the oxygen uptake amounted to 80 mole per cent and on analysis the reaction mixture was found to contain 18.5 mole per cent of hydroperoxide.

*Example 10*

Five parts of ethyl dehydroabietate was oxidized with molecular oxygen in the presence of 0.250 part of benzoyl peroxide at 60° C. After 21 hours, the oxygen uptake amounted to 31 mole per cent and on analysis the reaction mixture was found to contain 16.0 mole per cent of hydroperoxide.

*Example 11*

Ten parts of methyl dehydroabietate was placed in a reaction vessel fitted with a reflux condenser, agitator, and gas inlet tube and 250 parts of water and 0.5 part of potassium persulfate were added. The agitated mixture was heated to and held at about 80° C. for 40 hours, during which time a stream of air was bubbled through it. The reaction mixture was then extracted with ether and the resultant ether solution was dried with anhydrous sodium sulfate and then was evaporated to dryness. The product so obtained was analyzed and found to contain 17.8 mole per cent of hydroperoxide.

*Example 12*

Twenty parts of a dehydrogenated commercial methyl abietate, and containing 49% of methyl dehydroabietate, was oxidized with molecular oxygen in the presence of 0.750 part of benzoyl peroxide at 80° C. After 6.5 hours, the reaction mixture had absorbed 32.2 mole per cent of oxygen and on analysis was found to contain 20.6 mole per cent of hydroperoxide.

*Example 13*

Fifteen parts of ethyl dehydroabietate was oxidized with molecular oxygen in the presence of 0.75 part of benzoyl peroxide at 80° C. After 6.25 hours, the ester had absorbed 37.7 mole per cent of oxygen and the product was found on analysis to contain 40.3 mole per cent of hydroperoxide.

*Example 14*

Five parts of the methyl ester of 9-oxodehydroabietic acid was oxidized with molecular oxygen at 91.5° C. in the presence of 0.093 part of benzoyl peroxide in the same manner as described in the foregoing examples, the ester being liquefied and oxygen passed into the reaction mixture at the rate of 600 ml./min. After 45 hours, the ester had absorbed 51 mole per cent of oxygen and on analysis the product was found to contain 44 mole per cent of hydroperoxide.

The oxidate obtained when an ester of dehydroabietic acid or a substituted dehydroabietic acid is oxidized in liquid phase with an oxygen-containing gas, either in the presence or absence of an oxidation initiator, is a mixture of hydroperoxides of the ester, decomposition products thereof, and the unoxidized ester. The hydroperoxidic material may be separated from the unreacted ester by various means, particularly by extractive procedures. Distillation is not useful because of the thermal decomposition of the hydroperoxides. A very sharp separation of the oxidate into a hydroperoxide-rich fraction and an essentially hydroperoxide-free fraction may be achieved by means of counter-current extractions. The following examples will illustrate the separation by this method and the subsequent resolution of the hydroperoxide-rich fraction.

*Example 15*

Fifteen parts of an oxidate obtained by oxidizing methyl dehydroabietate with oxygen, and containing 55.8% hydroperoxide, was dissolved in 100 parts of methanol containing 10% water and the solution was then equilibrated against an equal volume of hexane. The aqueous methanol layer was separated and an equal volume of hexane added to it. A fresh portion of 100 parts of 10% aqueous methanol was added to the hexane solution in the first separator. The solutions were again equilibrated and the layers transferred, with fresh portions of solvent added and the solutions equilibrated as before. This procedure was continued until five separators were in use and the total volume of each solvent phase was equal to about 500 parts. The end fractions were then dropped off, collected and transfers were made as before until all five aqueous methanol layers had been collected together and all five hexane layers had been similarly combined. The hexane solution was washed with water and the solvent removed by distillation at room temperature under reduced pressure. The material thus recovered represented 43% of the oxidate and on analysis was shown to contain no hydroperoxides. The aqueous methanol solution was poured into a large volume of water and the hydroperoxidic material was extracted with ether. After removal of the ether, the recovered material represented 61% of the oxidate and on analysis was found to contain 79.5% hydroperoxides. This peroxide-rich fraction was again subjected to countercurrent extraction as described above, in this case using 22% aqueous methanol and heptane as the extractants. The material recovered from the aqueous methanol solution represented 35% of the oxidate and was found to contain 92.6% hydroperoxides. The fraction obtained from the heptane solution amounted to 22% of the oxidate and contained 56.1% hydroperoxides. This latter fraction was dissolved in 15 parts of methanol and after standing for 3 days at —15° C., the solution deposited white, needlelike crystals which were collected and dried. This crystalline hydroperoxidic material amounted to 13% of the hydroperoxides present in the oxidate and on further identification was found to be methyl 9-hydroperoxydehydroabietate. It has a melting point of 132.5°–133.5° C. and a specific rotation $a_D^{24}$ —14° (1% in ethanol) and is soluble in most solvents as, for example, alcohols such as methanol, ethanol, etc., ether, hydrocarbon solvents, both aliphatic and aromatic, etc.

Example 16

Seventy-five parts of a methyl dehydroabietate oxidate containing 50.1% hydroperoxides was dissolved in 500 parts of a 10% aqueous methanol and subjected to countercurrent extraction with an equal volume of hexane. The extraction was carried out in five separators through a series of twenty-five equilibrations as described in the foregoing example. The fraction recovered from the hexane amounted to 36% of the total oxidate and contained 3.6% hydroperoxide. The fraction recovered from the 10% aqueous methanol solution amounted to 67% of the total oxidate and contained 79.5% hydroperoxides. The latter fraction was then dissolved in 500 parts of a 20% aqueous methanol solution and subjected to countercurrent extraction with an equal volume of isooctane again through a series of twenty-five equilibrations. The fraction recovered from the aqueous methanol solution amounted to 47% of the foregoing peroxide-rich fraction and contained 87.4% hydroperoxides. The fraction recovered from the isooctane solution amounted to 20% of the previous hydroperoxide-rich fraction and contained 53.3% hydroperoxide and on dissolving in methanol and cooling to 0°–20° C., a yield of 21%, based on the hydroperoxide content of the oxidized ester, of the crystalline methyl 9-hydroperoxydehydroabietate was obtained.

Example 17

Sixty parts of a methyl dehydroabietate oxidate containing 52.0% hydroperoxides was dissolved in 400 parts of a 10% aqueous methanol solution and subjected to countercurrent extraction with an equal volume of hexane through a series of twenty-five equilibrations. The fraction recovered from the hexane solution amounted to 35 parts of the total oxidate and contained 5.0% hydroperoxides. The fraction recovered from the 10% aqueous methanol solution amounted to 66% of the total oxidate and contained 81.3% hydroperoxides. The latter fraction was then dissolved in 400 parts of a 20% aqueous methanol solution and subjected to countercurrent extraction with an equal volume of hexane. The fraction recovered from the aqueous methanol solution amounted to 34% of the previous peroxide-rich fraction and contained 92.7% hydroperoxides. The fraction recovered from the hexane solution amounted to 32% of the previous peroxide-rich fraction and contained 57.2% hydroperoxide. This fraction was then dissolved in methanol and the solution held at 0°–20° C., whereby a yield of 18% of crystalline methyl 9-hydroperoxydehydroabietate was obtained, based on the hydroperoxide content of the oxidized ester.

Example 18

Thirty parts of a methyl dehydroabietate oxidate containing 37.8% hydroperoxides was dissolved in 200 parts of a 10% aqueous methanol and subjected to countercurrent extraction with an equal volume of hexane through a series of twenty-five equilibrations. The fraction recovered from the hexane solution amounted to 67% of the total oxidate and contained negligible amounts of hydroperoxide. The fraction obtained from the aqueous methanol solution amounted to 33% of the total oxidate and contained 80.6% hydroperoxides. From this hydroperoxide-rich fraction, a yield of 12.4%, based on the hydroperoxide content of the oxidate, of crystalline methyl 9-hydroperoxydehydroabietate was obtained by a single crystallization from methanol.

Example 19

Ten parts of methyl 9-oxodehydroabietate was oxidized at 99.3° C. with molecular oxygen in the presence of 0.186 part of benzoyl peroxide. After 45 hours, the ketone had absorbed 80.3 mole per cent of oxygen and contained 52 mole per cent of hydroperoxide. This product was subjected to countercurrent extraction, using hexane and 20% aqueous methanol as the solvents, through a series of 25 equilibrations, using 100 parts of each solvent in each case. The fraction recovered from the hexane solution amounted to 29.3% of the total oxidate and contained 4% of hydroperoxide. The aqueous methanol solutions were poured into several volumes of water and the hydroperoxidic material extracted with ether. After drying the ether solution and removing the solvent by evaporation, a fraction was obtained which amounted to 70.7% of the total oxidate and contained 67% of hydroperoxide.

The foregoing Examples 15 to 19 have illustrated the separation of the hydroperoxide material from the oxidate by means of countercurrent extraction using combinations of aqueous methanol and hexane, heptane, or isooctane. Other solvent combinations can be used with equivalent results. For example, any aliphatic or alicyclic hydrocarbon solvent such as hexane, heptane, octane, isooctane, decane, cyclohexane, etc., may be used with the aqueous methanol to effect this separation. Aromatic hydrocarbons, ether, etc., appear to be such good solvents for the components of the oxidized ester that no separation can be made with them. The methanol may be replaced by other alcohols or hydrocarbon-immiscible solvents as, for example, ethanol, monomethyl ether of ethylene glycol, dioxane, acetone, etc.

Any ester of dehydroabietic acid or a substituted derivative thereof may be oxidized in accordance with this invention and obtain a hydroperoxide, provided that either the 9-position or the 14-position is unsubstituted; i. e., contains a hydrogen atom attached thereto. If both positions are unsubstituted as, for example, in an alkyl dehydroabietate, then both positions are subject to the oxidative attack with the result that the product is a mixture of the 9-hydroperoxide, 14-hydroperoxide, and 9,14-dihydroperoxide. In addition, some of the hydroperoxides may undergo cleavage and further oxidation so that small amounts of such products as alkyl 9-hydroxydehydroabietate, alkyl 9-oxodehydroabietate, alkyl 9-hydroxy-14-hydroperoxydehydroabietate, and alkyl 9-oxo-14-hydroperoxydehydroabietate will also be formed. In general, the preferential oxidative attack occurs in the 9-position. However, if the 9-position is already substituted as, for example, with a hydroxyl, oxo, etc., group, the oxidative attack occurs wholly at the 14-position. Proof of the position of the hydroperoxy radical in the molecule is shown by the following examples.

*Example 20*

Fifteen parts of a crystalline methyl 9-hydroperoxydehydroabietate, prepared as described in Example 15, was dissolved in 500 parts of methanol. The solution was agitated and with the temperature held at 10° C., 7 parts of ferrous sulfate dissolved in 1000 parts of a 25% aqueous methanol solution was added. The reaction mixture was allowed to come to room temperature and then was poured into 10 volumes of water and the product extracted with ether. The ethereal extract was washed with water and dried with sodium sulfate. The ether was then removed by distillation to obtain a residue amounting to 15 parts. This product was dissolved in aqueous methanol and crystallized, whereby a white, crystalline material was obtained having a melting point of 68°–69° C. The ultraviolet absorption spectrum of this methyl oxodehydroabietate showed that the carbonyl group was in a conjugate position with respect to the benzenoid nucleus. Thus, the oxo group had to be in either the 9- or 14-position of the dehydroabietic nucleus. That it was not in the 14-position was shown by the fact that this ketone gave a negative iodoform test. Since the keto group was thus shown to be in the 9-position, the hydroperoxide from which it was prepared likewise was substituted in the 9-position.

*Example 21*

The above example illustrates that in the oxidation of methyl dehydroabietate as described in the foregoing examples, one of the products is methyl 9-hydroperoxydehydroabietate. During this oxidation reaction, there is also an oxidative attack at the 14-position. While the amount of this latter product is small in comparison with the total hydroperoxide content, proof of the presence of such hydroperoxides is shown by the fact that on acid cleavage of the oxidate, acetone was evolved and a phenol produced. Two parts of the hydroperoxide-rich fraction, containing 81.3% hydroperoxide, obtained from an oxidized methyl dehydroabietate by fractional distribution between hexane and aqueous methanol, was placed in a reaction cell having a gas inlet tube located at the bottom and an exit tube near the top. The latter was connected in series with three traps containing an aqueous solution of 2,4-dinitrophenylhydrazine hydrochloride. p-Toluene-sulfonic acid (0.2 part) was added to the contents of the reaction cell and with the temperature at 70° C., a slow stream of nitrogen was passed through the reaction mixture and traps. After one hour, the traps were disconnected and the precipitated material was collected and dried. This orange-yellow precipitate, after being recrystallized twice from ethanol, melted at 125° C. and no depression of the melting point was observed on admixture of the crystals with an authentic sample of the 2,4-dinitrophenylhydrazone of acetone. Acetone could be produced only if a tertiary hydroperoxide, wherein two methyl radicals are attached thereto, were present and the 14-position is the only such possibility in the dehydroabietic nucleus. The residue from this treatment must, therefore, be a phenol and is believed to be a mixture of the methyl esters of octahydro-7-hydroxy-1,4a-dimethyl-1-phenanthrenecarboxylic acid, octahydro-7,9-dihydroxy-1,4a-dimethyl-1-phenanthrenecarboxylic acid, and octahydro-7-hydroxy-1,4a-dimethyl-9-oxo-1-phenanthrenecarboxylic acid.

Thus, in the oxidate obtained by the oxidation of methyldehydroabietate in accordance with this invention, a mixture of hydroperoxides is obtained, which mixture is believed to contain, in addition to methyl 9-hydroperoxy- and 14-hydroperoxydehydroabietates, at least traces of methyl 9-oxo-14-hydroperoxydehydroabietate, methyl 9-hydroxy-14-hydroperoxy-dehydroabietate, and methyl 9,14-dihydroperoxydehydroabietate.

*Example 22*

That when the 9-position is substituted, as, for example, in the oxidation of methyl 9-oxodehydroabietate, the oxidative attack is at the 14-position, has been shown by cleavage reactions applied to such an oxidate. A portion of the oxidate obtained in Example 19 above was treated with p-toluenesulfonic acid as described in Example 21. An orange-yellow precipitate immediately formed. This precipitate was collected and dried at 100° C. It had a melting point of 122°–126° C. and on recrystallization from ethanol, the melting point was 124.5°–126° C. That acetone had been evolved and the 2,4-dinitrophenylhydrazone formed was proved by the fact that on admixture of this recrystallized material with an authentic sample of the 2,4-dinitrophenylhydrazone of acetone, there was no depression in the melting point. The residual solid material remaining in the reaction cell was dissolved in ether and the solution washed with water until free of acid, and then extracted with a 2% aqueous potassium hydroxide solution. The alkaline extract was neutralized with dilute hydrochloric acid and the organic material was extracted with ether. After washing and drying the ethereal solution, the solvent was removed by evaporation. The residue was then crystallized from aqueous acetone and on recrystallization, fine white needles were obtained having a melting point of 196°–197° C. Elementary analysis of this product showed it to be in agreement with that of the methyl ester of octahydro-7-hydroxy-1,4a-dimethyl-9-oxo-1-phenanthrenecarboxylic acid ($C_{18}H_{22}O_4$). Acetone could not have been evolved on the acid cleavage of the hydroperoxide of methyl 9-oxodehydroabietate and a ketophenol formed unless a tertiary hydroperoxide were present, which hydroperoxide group contained two methyl groups attached thereto, the only possibility of such being in the 14-position.

The esters of dehydroabietic acid which are oxidized in accordance with this invention may be prepared from dehydroabietic acid by any of the methods commonly employed in the production of carboxylic acid esters. They may be prepared by esterification of dehydroabietic acid or substituted dehydroabietic acids with an alcohol under pressure or by heating an alkali metal dehydroabietate with an alkyl halide. They may also be prepared by esterification of the acid chloride of dehydroabietic acid with an alcohol. In the preparation of esters of dehydroabietic acid, the dehydroabietic acid which is esterified is readily obtained from a dehydrogenated or disproportionated rosin as, for example, by extraction with acetone, ethyl acetate, alcohol, petroleum ether, etc. Instead of the esters of pure dehydroabietic acid, an esterified commercial dehydrogenated rosin or a commercial rosin ester may be dehydrogenated and used.

While the foregoing examples have shown the oxidation reaction of this invention applied to the methyl and ethyl esters, any alkyl, hydroxyalkyl, aryl, or aralkyl dehydroabietate or substituted dehydroabietate may be oxidized as, for example, propyl, butyl, hydroxyethyl, glycerol, benzyl, etc., esters with equivalent results.

The oxidation reaction in accordance with this invention is carried out by passing an oxygen-containing gas through the ester in the liquid state; i. e., through the molten ester or through a solution of the ester dissolved in an inert solvent or a mixture of molten ester with an aqueous phase. Solvents which may be used for preparing the solution are preferably those which are inert under the conditions of the oxidation reaction such as, for example, aromatic hydrocarbons and particularly aromatic hydrocarbons containing such stable substituents as the tert.-butyl group, chlorobenzene, etc.

Any gas containing free oxygen may be used for carrying out the oxidation as, for example, pure oxygen, air, or any other mixture of oxygen and an inert gas. The rate at which the oxygen-containing gas is passed into the ester may vary over a wide range depending upon the concentration of oxygen in the gas, the pressure at which the oxidation is carried out, and the efficiency of the dispersion of the gas through the reaction mixture. Since the oxidation reaction in accordance with this invention is a heterogeneous one, suitable agitation is necessary. It is particularly important to bring the air, oxygen, or other oxygen-containing gas into intimate contact with the liquid phase. This may be done by using high speed agitators, suitable nozzles, or porous plates on the gas inlet, etc.

The temperature at which the oxidation is carried out will depend upon the reaction conditions. For example, if the oxidation is carried out in the absence of a solvent, the temperature should be at least that of the melting point of the ester being oxidized; i. e., at a temperature above about 62° C. in the case of methyl dehydroabietate, 30° C. in the case of ethyl dehydroabietate, 104° C. in the case of the glycerol ester of dehydroabietic acid, 68° C. in the case of methyl 9-oxodehydroabietate, etc. On the other hand, some of the alkyl dehydroabietates as, for example, methyl dehydroabietate, sublime rather readily in a current of gas and therefore are lost from the system during the period of oxidation if the temperature is too high. Thus, in the case of methyl dehydroabietate which sublimes rather readily at temperatures of 90° C. and above, the oxidation is preferably carried out at a temperature below this point. If a solution of the ester is used for carrying out the oxidation reaction, much lower temperatures may be used for the oxidation. While it is possible to carry out the oxidation at room temperature, the rate of reaction is too slow to be practical and the reaction in solution is usually carried out at slightly higher temperatures.

Another factor in determining the temperature at which the oxidation is carried out is whether it is carried out in the presence or absence of an initiator. In the latter case, the minimum temperature will be that at which the initiator decomposes to form free radicals. If no initiator is used, slightly higher temperatures may be required for the oxidation. Consequently, the temperature at which the oxidation is carried out is, in general, between about 60° C. and about 130° C., a more desirable range being between about 65° C. and about 100° C. A particularly advantageous temperature range for the oxidation of an alkyl dehydroabietate is from about 70° C. to about 90° C. and for an alkyl 9-substituted dehydroabietate from about 80° C. to about 100° C.

Another consideration in the determination of the temperature at which the oxidation is carried out is the pressure existing during the oxidation. At atmospheric pressure it is desirable that the temperature be kept below about 130° C. in order to obtain high yields of the hydroperoxides and keep the decomposition of the hydroperoxides at a minimum. However, at pressures greater than atmospheric, higher temperatures may be used. While the decomposition of the hydroperoxide is increased at such temperatures, this is offset by the increased rate of hydroperoxide formation caused by the elevation of the pressure.

As may be seen from the foregoing examples, the oxidation may be carried out in the presence or absence of an initiator. When the oxidation is carried out in the absence of an initiator, the reaction is characterized by an induction period of variable duration depending upon temperature and other reaction conditions but which may be as long as two days. However, after this period of induction, the rate of oxidation increases rapidly but even so is not as great as when the oxidation is carried out in the presence of an initiator. Thus, the oxidation in the absence of an initiator consumes a greater overall length of time.

While the oxidation may be carried out in the absence of an initiator, the reaction is much more efficiently carried out in the presence of an agent which will catalyze or initiate the oxidation of the ester. The induction period can be completely eliminated and the rate of oxidation is increased. In general, any material which undergoes thermal decomposition with the consequent formation of free radicals under the reaction conditions and which may be called free-radical formers may be used as the initiator in the reaction. Examples of such initiators are those peroxidic materials such as potassium persulfate and organic peroxides and organic hydroperoxides which form free radicals under the reaction conditions. The more readily the peroxidic free radical oxidation initiator liberates free radicals the more efficient it is, whereas the more stable the peroxidic material the slower and less efficient it is as an initiator in the reaction. Thus, while the alkyl hydroperoxydehydroabietates, or an oxidate containing an alkyl hydroperoxydehydroabietate from a previous batch, may be used to initiate the reaction, they are not as effective as many other free-radical formers since the reaction is preferably carried out under conditions which will not promote the decomposition of the hydroperoxydehydroabietate. Exemplary of the organic peroxides which may be used to initiate the oxidation are the acyl peroxides such as acetyl peroxide, propionyl peroxide, benzoyl peroxide, etc., alkyl peroxides such as tert.-butyl peroxide, methyl ethyl peroxide, etc., dialkyl ether peroxides such as dibutyl ether peroxide, diisopropyl ether peroxide, etc. Organic hydroperoxides may also be used to initiate the oxidation as, for example, alkyl hydroperoxides such as tert.-butyl hydroperoxide, tert.-amyl hydroperoxide and alkyl aryl and alkyl cycloalkyl hydroperoxides such as diphenylmethyl hydroperoxide, triphenylmethyl hydroperoxide, $\alpha,\alpha$-dimethylbenzyl hydroperoxide, $\alpha,\alpha$-dimethyl-p-methylbenzyl hydroperoxide, $\alpha,\alpha$-dimethyl-p-isopropylbenzene hydroperoxide, $\alpha,\alpha,\alpha',\alpha'$-tetramethyl-p-xylidene dihydroperoxide, methylcyclohexyl hydroperoxide, dimethylcyclopentyl hydroperoxide, tetralin hydroperoxide, cyclohexene hydroperoxide and naphthene hydroperoxides. In addition to the peroxidic free radical oxidation initiators, such free-radical formers as azo-bis(isobutyronitrile), phenylazotriphenylmethane, benzoylazotriphenylmethane, and naphthylazotriphenylmethane may be used.

The concentration of the free-radical former used as an initiator in the oxidation reaction in accordance with this invention may be varied over a broad range. In general, an amount of from about 0.1% to about 20% may be used, preferably from about 0.3% to about 10% and more preferably from about 1% to about 10%, based on the weight of the ester being oxidized. Much higher concentrations may be used but are not believed to give any greater increase in the rate of oxidation.

The rate of oxidation is, of course, a function of the catalyst concentration, ester concentration if a solution is used, temperature and pressure. Thus, the time at which the hydroperoxide content of the reaction mixture reaches a maximum is determined by the specific reaction conditions. For example, in the case of methyl dehydroabietate when the oxidation is carried out on the molten ester containing about 2 mole per cent of benzoyl peroxide at temperatures of about 70° C. to about 90° C., the reaction is substantially complete in from about 15 to 48 hours. However, if no initiator is used, much longer times are required to obtain the maximum hydroperoxide content.

The new hydroperoxides of esters of dehydroabietic acid and substituted dehydroabietic acids produced in accordance with this invention may be used as initiators in free radical reactions such as polymerization processes. They are especially important as intermediates in the synthesis of other valuable products, particularly in the production of pharmaceuticals.

What I claim and desire to protect by Letters Patent is:

1. An ester of an acid selected from the group consisting of 9-hydroperoxydehydroabietic acid, 14-hydroperoxydehydroabietic acid, 9,14-dihydroperoxydehydroabietic acid, 9-hydroxy-14-hydroperoxydehydroabietic acid, 9-oxo-14-hydroperoxydehydroabietic acid.

2. An ester of 9-hydroperoxydehydroabietic acid.

3. An ester of 14-hydroperoxydehydroabietic acid.

4. An ester of 9-oxo-14-hydroperoxydehydroabietic acid.

5. An alkyl 9-hydroperoxydehydroabietate.

6. An alkyl 14-hydroperoxydehydroabietate.

7. An alkyl 9-oxo-14-hydroperoxydehydroabietate.

8. Methyl 9-hydroperoxydehydroabietate.

9. Methyl 14-hydroperoxydehydroabietate.

10. Methyl 9-oxo-14-hydroperoxydehydroabietate.

11. Ethyl 9-hydroperoxydehydroabietate.

12. The process which comprises oxidizing an ester of an acid containing the dehydroabietic acid nucleus and hydrogen attached to a carbon in at least one of the positions in said nucleus selected from the group consisting of the 9- and 14-positions, in liquid phase with a gas containing free oxygen in the presence of a free radical oxidation initiator.

13. The process which comprises oxidizing an ester of an acid containing the dehydroabietic acid nucleus and hydrogen attached to a carbon in at least one of the positions in said nucleus selected from the group consisting of the 9- and 14-positions, in liquid phase with a gas containing free oxygen in the presence of a peroxidic free radical oxidation initiator.

14. The process which comprises oxidizing an alkyl dehydroabietate in liquid phase with a gas containing free oxygen in the presence of a free radical oxidation initiator.

15. The process which comprises oxidizing an alkyl 9-oxodehydroabietate in liquid phase with a gas containing free oxygen in the presence of a free radical oxidation initiator.

16. The process which comprises oxidizing methyl dehydroabietate in liquid phase with a gas containing free oxygen in the presence of a peroxidic free radical oxidation initiator.

17. The process which comprises oxidizing ethyl dehydroabietate in liquid phase with a gas containing free oxygen in the presence of a peroxidic free radical oxidation initiator.

18. The process which comprises oxidizing methyl 9-oxodehydroabietate in liquid phase with a gas containing free oxygen in the presence of a peroxidic free radical oxidation initiator.

19. The process which comprises oxidizing methyl dehydroabietate in liquid phase with a gas containing free oxygen in the presence of a peroxidic free radical oxidation initiator and separating the hydroperoxidic material from the oxidate by countercurrent extraction with a pair of immiscible solvents.

20. The process which comprises oxidizing methyl 9-oxodehydroabietate in liquid phase with a gas containing free oxygen in the presence of a peroxidic free radical oxidation initiator and separating the hydroperoxidic material from the oxidate by countercurrent extraction with a pair of immiscible solvents.

PAUL F. RITCHIE.

References Cited in the file of this patent

UNITED STATES PATENTS

| Number | Name | Date |
|---|---|---|
| 2,434,643 | Drake | Jan. 20, 1948 |
| 2,435,831 | Harvey | Feb. 10, 1948 |
| 2,554,810 | Breslow | May 29, 1951 |